(12) United States Patent
Adhikari et al.

(10) Patent No.: US 12,351,759 B1
(45) Date of Patent: Jul. 8, 2025

(54) MOBILE PYROLYSIS PLANT AND RELATED SYSTEMS AND METHODS

(71) Applicant: Charm Industrial, Inc., San Francisco, CA (US)

(72) Inventors: Subodh Adhikari, Oakland, CA (US); Edward Young, Albany, CA (US); Alden Ahlholm, San Francisco, CA (US); Mark Hamann, Erie, CO (US)

(73) Assignee: Charm Industrial, Inc., San Francisco, CA (US)

( * ) Notice: Subject to any disclaimer, the term of this patent is extended or adjusted under 35 U.S.C. 154(b) by 0 days.

(21) Appl. No.: 18/636,828

(22) Filed: Apr. 16, 2024

Related U.S. Application Data

(60) Provisional application No. 63/619,582, filed on Jan. 10, 2024.

(51) Int. Cl.
| | |
|---|---|
| C10B 53/02 | (2006.01) |
| C01B 3/02 | (2006.01) |
| C05D 3/00 | (2006.01) |
| C05D 9/00 | (2006.01) |
| C10B 47/24 | (2006.01) |
| C10B 57/00 | (2006.01) |
| C10J 3/00 | (2006.01) |
| C10J 3/60 | (2006.01) |
| C10L 5/44 | (2006.01) |

(52) U.S. Cl.
CPC ............... *C10B 53/02* (2013.01); *C01B 3/02* (2013.01); *C05D 3/00* (2013.01); *C05D 9/00* (2013.01); *C10B 47/24* (2013.01); *C10B 57/005* (2013.01); *C10J 3/00* (2013.01); *C10J 3/60* (2013.01); *C10L 5/445* (2013.01); *C10J 2200/31* (2013.01); *C10J 2300/0916* (2013.01)

(58) Field of Classification Search
CPC ....... C10B 53/02; C10B 47/24; C10B 57/005; C10J 3/00; C10L 5/445
See application file for complete search history.

(56) References Cited

U.S. PATENT DOCUMENTS

| | | | |
|---|---|---|---|
| 7,794,862 | B2 | 9/2010 | Wojtowicz et al. |
| 7,931,783 | B2 | 4/2011 | Dam-Johansen et al. |
| 7,935,227 | B2 | 5/2011 | Dam-Johansen et al. |
| 7,943,014 | B2 * | 5/2011 | Berruti .................... C10B 53/02 202/121 |

(Continued)

FOREIGN PATENT DOCUMENTS

WO WO-2006117005 A1 11/2006

OTHER PUBLICATIONS

Invitation to Pay Additional Fees for International Patent Application No. PCT/US2025/010691 dated Apr. 14, 2025 (14 pages).

*Primary Examiner* — Jonathan Miller
(74) *Attorney, Agent, or Firm* — Goodwin Procter LLP

(57) ABSTRACT

This disclosure relates to a mobile pyrolysis plant and related systems and methods. An example method includes: providing a mobile pyrolyzer configured to traverse a field where biomass is grown; providing harvested biomass to the mobile pyrolyzer as the mobile pyrolyzer traverses the field; subjecting the harvested biomass to a fast pyrolysis process in the mobile pyrolyzer to generate biochar, bio-oil, and syngas as the mobile pyrolyzer traverses the field; and applying the biochar to the field as the mobile pyrolyzer traverses the field.

24 Claims, 4 Drawing Sheets

(56) References Cited

U.S. PATENT DOCUMENTS

| | | | |
|---|---|---|---|
| 8,100,990 B2 * | 1/2012 | Ellens | C10L 5/447 44/589 |
| 8,558,044 B2 * | 10/2013 | Smaidris | C10B 53/02 201/22 |
| 8,574,405 B1 | 11/2013 | Cheiky et al. | |
| 8,888,874 B1 * | 11/2014 | Borchert | C10B 53/02 48/61 |
| 9,920,251 B2 * | 3/2018 | Karanikas | B29B 17/04 |
| 9,994,774 B2 * | 6/2018 | Li | C10B 47/30 |
| 10,751,885 B2 * | 8/2020 | Olander | C10B 25/14 |
| 11,465,948 B2 * | 10/2022 | Aramburu | C05D 9/02 |
| 11,618,854 B1 | 4/2023 | Ma | |
| 2005/0191531 A1 | 9/2005 | Wojtowicz et al. | |
| 2008/0006519 A1 * | 1/2008 | Badger | C10B 49/20 48/127.3 |
| 2008/0006520 A1 * | 1/2008 | Badger | C10B 51/00 202/202 |
| 2011/0258914 A1 * | 10/2011 | Banasiak | C10K 1/02 44/605 |
| 2012/0103781 A1 * | 5/2012 | Smaidris | C10C 5/00 201/8 |
| 2013/0067802 A1 | 3/2013 | Seidel et al. | |
| 2018/0237692 A1 * | 8/2018 | Liu | B09C 1/00 |
| 2021/0397193 A1 * | 12/2021 | Aramburu | C10B 53/02 |
| 2022/0306940 A1 * | 9/2022 | Goldschlager | C10K 1/001 |
| 2023/0036555 A1 | 2/2023 | Aramburu et al. | |

* cited by examiner

MOBILE PYROLYSIS PLANT AND RELATED SYSTEMS AND METHODS

CROSS-REFERENCE TO RELATED APPLICATIONS

This application claims priority to and the benefit of U.S. Provisional Patent Application No. 63/619,582, filed on Jan. 10, 2024, the entire disclosure of which is hereby incorporated by reference for all purposes.

TECHNICAL FIELD

In various examples, the present disclosure relates to pyrolysis and, more specifically, to a mobile pyrolysis plant for performing pyrolysis in a field where biomass is grown.

BACKGROUND

Pyrolysis is a process in which biomass is heated in a low oxygen environment to convert the biomass into biochar and a gas stream containing condensable and non-condensable gases. Bio-oil can be condensed or separated out of the gas stream. The remaining gas can be referred to as syngas.

The production of bio-oil and biochar by pyrolysis typically involves harvesting biomass and then transporting the harvested biomass to a remote location where a pyrolysis plant is located. The effort and expense associated with collecting and transporting the biomass can make the production of bio-oil and biochar labor-intensive and economically unfeasible.

There is a need for improved systems and methods for performing pyrolysis to produce bio-oil and biochar.

SUMMARY

In certain examples, this disclosure relates to a mobile pyrolysis plant (alternatively referred to as a mobile pyrolyzer) configured to perform pyrolysis as it traverses a field where biomass is grown. The mobile pyrolysis plant is configured to obtain biomass harvested from the field (e.g., using a combine or other harvesting machine) and perform pyrolysis on the biomass as the mobile pyrolysis plant traverses the field. Biochar produced by the mobile pyrolysis process can be deposited onto the field to provide agronomic benefits. In some examples, K-feldspar, calcium hydroxide, or other minerals or nutrients can be deposited onto the field along with the biochar. Additionally or alternatively, syngas produced by the mobile pyrolysis plant can be used to generate heat and/or electricity used by the mobile pyrolysis plant.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings.

DETAILED DESCRIPTION

It is contemplated that apparatus, systems, methods, and processes of the claimed invention encompass variations and adaptations developed using information from the embodiments described herein. Adaptation and/or modification of the apparatus, systems, methods, and processes described herein may be performed by those of ordinary skill in the relevant art.

It should be understood that the order of steps or order for performing certain actions is immaterial so long as the invention remains operable. Moreover, two or more steps or actions may be conducted simultaneously.

In various examples, "biomass" is or includes an organic material that is derived from living organisms such as plants. Biomass can be or include, for example, harvested plant materials, agricultural waste (e.g., corn stover), forestry residue (e.g., branches, leaves, etc.), woody biomass (e.g., trees, shrubs, bushes, etc.), non-woody biomass (e.g., sugar cane, cereal straw, seaweed, algae, cotton, grass, kelp, soil, etc.), and/or processed waste (e.g., cereal husks and cobs, bagasse, nut shells, plant oil cake, sawmill waste, food waste, etc.). Biomass can include fat, oil, lignin, starch, cellulose, hemicellulose, or any combination thereof.

Figure 1:
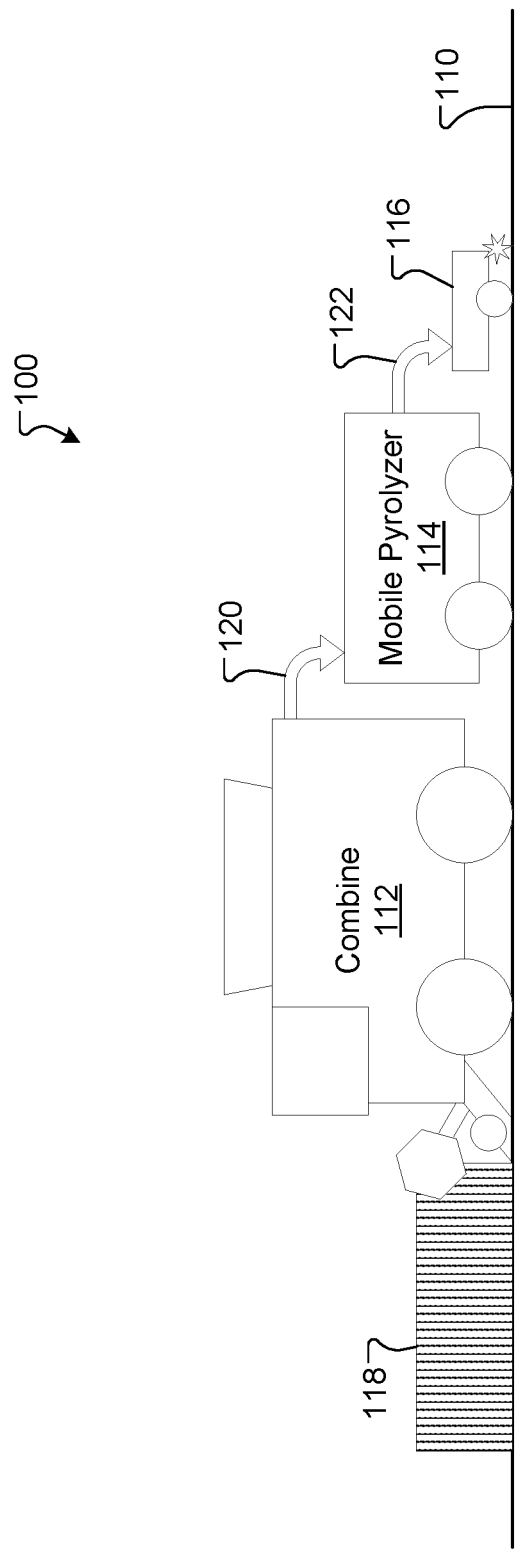
FIG. 1 is a schematic diagram of a mobile pyrolysis system configured to harvest biomass from a field, perform pyrolysis on the biomass, and apply biochar to the field, as the mobile pyrolysis system traverses the field, in accordance with certain examples.

FIG. 1 is a schematic diagram of a system 100 for harvesting and processing biomass on a field 110, in accordance with certain examples. The system 100 includes a harvester 112 (e.g., a combine or other biomass harvesting machine), a mobile pyrolysis plant or pyrolyzer 114, and an injector or spreader 116. The harvester 112 travels along the field 110 and harvests a crop 118 or other plant material, such as corn, wheat, rice, oats, barley, rye, or soybeans. The harvester 112 can separate the harvested crop 118 into a portion that is retained in the harvester 112 (e.g., grain, fruit, or other edible or consumable materials) and portion that is discarded, which can include, for example, straw, stems, and/or leaves (e.g., corn stover). The discarded portion can be chopped into pieces, compressed, or otherwise processed and provided as biomass 120 to the mobile pyrolyzer 114 and/or can be applied to the field 110.

The mobile pyrolyzer 114 can receive the biomass 120 from the harvester 112 (or other machine or device) and/or can collect the biomass 120 from the field 110, and can subject the biomass 120 to a pyrolysis process. Outputs from the pyrolysis process can include bio-oil, syngas, and biochar 122. The bio-oil can be stored in a tank on or attached to the mobile pyrolyzer 114. The bio-oil can be periodically offloaded to a larger storage tank on or near the field 110, as desired. The syngas can be burned on the mobile pyrolyzer 114 to generate heat and/or electricity. For example, the heat can be provided to a reactor on the mobile pyrolyzer 114. Additionally or alternatively, electricity generated from the syngas can be used to provide power for one or more components on the mobile pyrolyzer 114.

At least a portion of the biochar 122 produced by the mobile pyrolyzer 114 can be applied to the field 110, for example, using the spreader 116 or other device. The biochar 122 can provide agronomic benefits to the field 110, including, for example, a nutrient-rich soil amendment, improved soil fertility, higher plant yield, and reduced need for irrigation. Applying the biochar 122 to the field 110 can, in some examples, compensate for the biomass 120 that was provided to the mobile pyrolyzer 114 but could otherwise have been applied to the field 110. In some examples, the biochar 122 can be applied to the field 110 along with one or more additives, such as, for example, a nutrient, a fertilizer, an herbicide, a pesticide, and/or seeds. The spreader 116 can apply the biochar 122 and/or additive(s) using drop type of spreader or a broadcast spreader (e.g., a rotary spreader). In some examples, the spreader 116 can include a tiller for mixing soil and/or a seed drill or injector device for applying the biochar and/or additive(s) to the soil.

In certain implementations, the one or more additives applied to the field 110 along with the biochar 122 can include a silicate, such as K-feldspar (potassium feldspar), which can be in the form of a powder or small particles or granules. The K-feldspar, one or more other silicates (e.g., potassium silicate, sodium silicate, and/or calcium silicate), or other minerals, additives, or nutrients can be stored on the spreader 116 and/or the mobile pyrolyzer 114 and can be mixed with the biochar 122 before or during application to the field 110. In general, crops can require different amounts of nitrogen (N), phosphorous (P), potassium (K), magnesium (Mg), calcium (Ca), and other nutrients, and these nutrients may not be present in biochar in a desired amount or ratio. In some examples, the addition of K-feldspar can supplement the biochar 122 with additional potassium, for example, to achieve a desired ratio between potassium and phosphorus. Further, the addition of K-feldspar or other silicate can remove carbon dioxide from the air through enhanced rock weathering. In some examples, calcium hydroxide can be applied to the field 110 with the biochar 122, with or without K-feldspar or other materials. The calcium hydroxide can increase a pH level of the soil in the field 110.

In various examples, the mobile pyrolyzer 114 can be configured as a trailer (e.g., pulled by the harvester 112 or other vehicle) or can be configured to be self-propelled (e.g., with an engine and drivetrain). The mobile pyrolyzer 114 can traverse the field 110 next to the harvester 112, such as behind the harvester 112 (as depicted) or to a side of the harvester 112. In some examples, the mobile pyrolyzer 114 and the harvester 112 (or other harvesting device) can be integrated into a single vehicle or machine. Alternatively or additionally, the mobile pyrolyzer 114 can traverse the field 110 without the harvester 112. For example, the mobile pyrolyzer 114 can traverse the field 110 to collect the biomass 120 any number of minutes, hours, or days after the harvester 112 discarded the biomass 120 onto the field 110. In some instances, the mobile pyrolyzer 114 can be configured to traverse the field 110 or other area autonomously, for example, using one or more cameras, lidar sensors, artificial intelligence, or other autonomous driving equipment or technology.

In certain implementations, the mobile pyrolyzer 114 can be moved to a fixed location at an edge of the field 110 (or other position on or near the field 110 and/or other fields) and receive deliveries of biomass harvested from the field 110. For example, the mobile pyrolyzer 114 can be positioned within about 1 meter, 10 meters, or 100 meters of the edge or boundary of the field 110. The mobile pyrolyzer 114 can receive periodic deliveries of the harvested crop 118 or the biomass 120 (e.g., from the harvester 112, a tractor, a truck, or other machine) and can perform a pyrolysis process (e.g., fast pyrolysis) from a fixed location. Compared to using a pyrolysis plant at a remote or distant location, positioning the mobile pyrolyzer 114 on or near the field 110 can reduce costs, labor, and processing times associated with collecting and transporting harvested biomass. In some examples, the mobile pyrolyzer 114 can be sized to fit on or within a standard, U.S. semi-trailer (e.g., having a length of 53 feet and a width of 8.5 feet). Additionally or alternatively, the mobile pyrolyzer 114 can be configured to process about 5 to 20 metric tons (e.g., about 10 metric tons) of biomass per day, though other amounts are contemplated.

Likewise, in certain examples, the spreader 116 can be configured as a trailer (e.g., pulled by the harvester 112, the mobile pyrolyzer 114, or other vehicle) or can be configured to be self-propelled (e.g., with an engine and drivetrain). The spreader 116 can traverse the field 110 next to the mobile pyrolyzer 114, such as behind the mobile pyrolyzer 114 (as depicted) or to a side of the mobile pyrolyzer 114. The spreader 116 and the mobile pyrolyzer 114 can be integrated into a single machine or vehicle. Additionally or alternatively, the spreader 116, the mobile pyrolyzer 114, and/or the harvester 112 can be integrated into a single vehicle or machine. Alternatively or additionally, the mobile pyrolyzer 114 can traverse the field 110 without the mobile pyrolyzer 114. For example, the spreader 116 can contain a supply of the biochar 122 and/or K-feldspar and can traverse the field 110 any number of minutes, hours, or days after the mobile pyrolyzer 114 produced the biochar 122 from the biomass 120. In some instances, the spreader 116 can be configured to traverse the field 110 or other area autonomously, for example, using one or more cameras, lidar sensors, artificial intelligence, or other autonomous driving equipment or technology.

Figure 2:
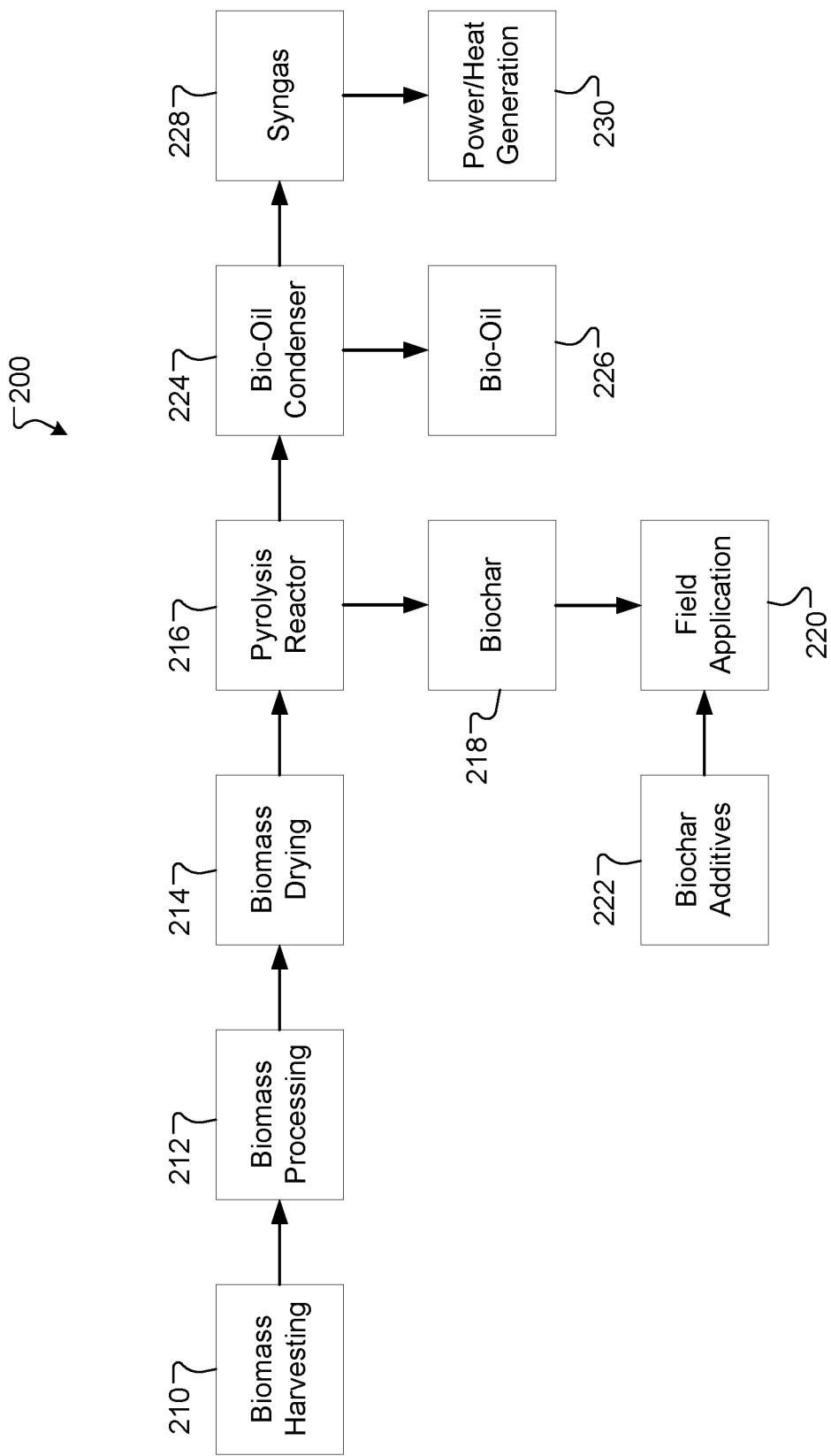
FIG. 2 is a schematic diagram of a mobile pyrolysis process, in accordance with certain examples.

FIG. 2 is a schematic diagram of a method 200 of processing biomass, in accordance with certain examples. Biomass is harvested (step 210) from a field (e.g., the field 110) and processed (step 212) to achieve an appropriate size, shape, and other target characteristics for the biomass. The harvesting and processing steps can be performed by a harvester (e.g., the harvester 112) or other suitable equipment. Processing the biomass can involve cutting, chopping, shredding, or otherwise processing the biomass into particles ranging in size from about, for example, 5 mm to about 50 mm, or from about 5 mm to about 25 mm. In some instances, for example, the biomass can be chopped, cut, or otherwise processed into pellets or chips having an average diameter or length of about 6 mm or about 10 mm. The processed biomass can have average, minimum, or maximum particle sizes (e.g., diameters or lengths) that are greater than, less than, or equal to, for example, about 5 mm, 10 mm, 15 mm, 20 mm, 25 mm, 30 mm, 35 mm, 40 mm, 45 mm, 50 mm, or larger. The processed biomass is optionally dried (step 214) using heat and/or forced air (e.g., on the harvester 112) to achieve a target moisture content (e.g., about 5% to 20% or about 10% to 15%, by weight, depending on the biomass type). In some examples, the biomass can be dried by burning syngas generated from pyrolysis, as described herein. Alternatively or additionally, the biomass can be dried on the field (e.g., at a field edge) after being harvested and/or processed.

The dried biomass is provided to a pyrolysis reactor 216 (e.g., in the mobile pyrolyzer 114) which heats the biomass in the absence of oxygen to produce biochar 218 and a gas stream containing vapors. The biochar can be collected and/or deposited (step 220) onto the field (e.g., using the spreader 116) to provide agronomic benefits. In some examples, the biochar can be prepared for field reintegration by, for example, cooling the biochar and/or making the biochar inert through controlled oxidation or through the application of water to reduce reactivity (e.g., to prevent a reaction with oxygen). One or more additives (e.g., K-feldspar) can be applied (step 222) to the field along with the biochar 218. The vapors exiting the reactor 216 can be subjected to a condenser or separator that condenses (step 224) at least a portion of the vapors into bio-oil 226. The gas that remains after the condenser or separator, referred to as syngas 228, can be used to generate heat and/or power (step 230) for the reactor 216 or other components of a pyrolyzer (e.g., the mobile pyrolyzer 114), as described herein.

Figure 3:
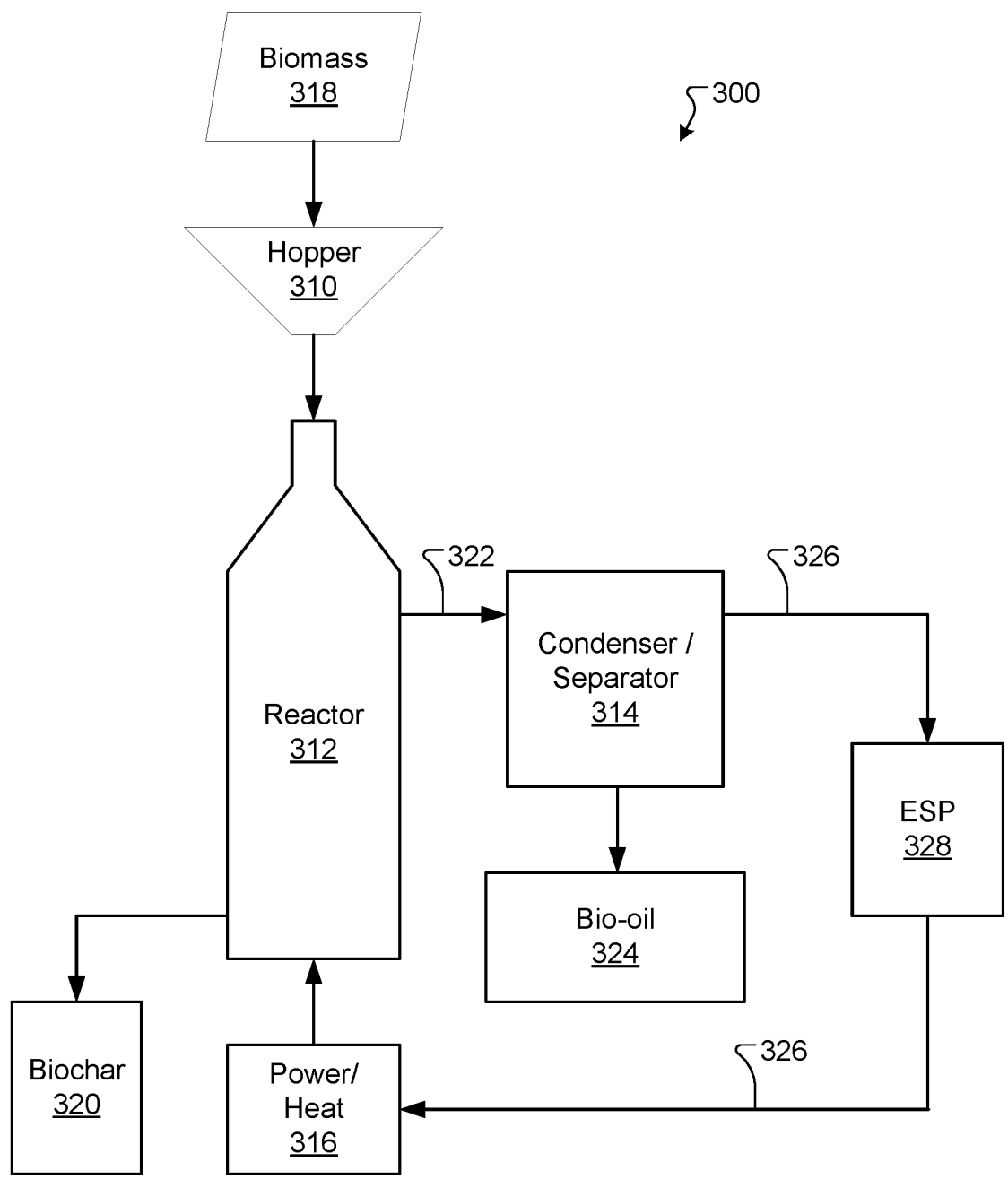
FIG. 3 is a schematic diagram of a pyrolysis plant, in accordance with certain examples.

FIG. 3 is a schematic diagram of a pyrolyzer 300 (e.g., the mobile pyrolyzer 114) for performing a pyrolysis process on biomass, in accordance with certain examples. The pyrolyzer 300 includes, among other components, a hopper 310, a reactor 312, a condenser/separator 314, and a heater or power generator 316. Biomass 318 is harvested, processed, and optionally dried, as described herein, and provided to the hopper 310. The hopper 310 feeds the biomass 318 to the reactor 312, which heats the biomass 318 in the absence of oxygen. This causes the biomass 318 to decompose into biochar 320 and a gas stream 322 containing vapors.

In various examples, the reactor 312 can use a variety of temperatures (e.g., at a range of 400° C. to 800° C.), heating rates, and residence times (e.g., from less than a second to many minutes). In some examples, a highest yield of bio-oil can be achieved using a fast or flash pyrolysis technique. The fast pyrolysis process can involve heating the biomass 318 to roughly 500° C. at a high heating rate (e.g., from about 20° C. to about 500° C. in less than 1 second, or at a rate of about 1000° C./s). Alternatively or additionally, a slow or intermediate pyrolysis process can be used. Compared to fast pyrolysis, the slow or intermediate pyrolysis process can have a slower heating rate and/or a wider temperature range (e.g., for a final temperature) and, in some examples, can result in a lower yield of bio-oil. The reactor 312 can be an updraft reactor, an autothermal reactor, a fluidized bed reactor, other suitable type of reactor, or any combination thereof. The reactor 312 can operate in a fluidized condition in which particles of biomass and/or biochar are suspended within a fluid flowing through the reactor 312. The reactor 312 can be operated autothermally.

In some implementations, the reactor 312 can be configured or optimized to produce a high yield of bio-oil, compared to yields of biochar, syngas, and/or other outputs. A high yield of bio-oil can be achieved using fast pyrolysis techniques, an autothermal reactor, and/or a fluidized bed reactor, as described herein. Additionally or alternatively, a high yield of bio-oil can be achieved by burning at least a portion of the biochar inside the reactor 312. In various examples, the reactor 312 can convert 1 kg of biomass into from about 0.4 kg to about 0.75 kg of bio-oil, from about 0.1 kg to about 0.25 kg of biochar, and from about 0.1 kg to about 0.3 kg of syngas. By contrast, a reactor configured to produce lower yields of bio-oil and higher yields of biochar (e.g., using slow pyrolysis or medium pyrolysis) can convert 1 kg of biomass into from about 0.2 kg to about 0.4 kg of bio-oil, from about 0.2 kg to about 0.4 kg of biochar, and from about 0.1 kg to 0.2 kg of syngas.

In various examples, the pyrolysis process described herein can utilize one or more catalysts, which can make the pyrolysis process more efficient and/or can yield higher quality bio-oils (e.g., by removing oxygenated compounds). A variety of catalysts can be used, including, for example, one or more zeolites, metal oxides (e.g., $Al_2O_3$, $SiO_2$, $TiO_2$, $SO_4$, MgO, and/or CaO), alkali metals, alkaline earth metals (e.g., beryllium, magnesium, calcium, strontium, barium, and/or radium), or any combination thereof. The catalyst(s) can be included in the reactor 312 and can come into contact with the biomass 318 and/or gases present in the reactor 312. In some examples, the catalyst(s) can be mixed with the biomass 318 in the reactor 312. The catalyst(s) can be in a particulate form and/or can be suspended or fluidized in the reactor 312 (e.g., along with the biomass 318). The catalyst(s) can reside in the reactor 312 indefinitely (e.g., permanently) or can be added to or removed from the reactor 312. For example, the catalyst(s) can be added to the reactor 312 with the biomass 318 (e.g., using the hopper 310) and can be removed from the reactor 312 (e.g., along with the biochar 320).

The biochar 320 produced in the reactor 312 can be collected, stored in a bin, and/or applied to a field (e.g., the field 110) to achieve agronomic benefits, as described herein. In some examples, the biochar 320 can be collected from a bottom portion of the reactor 312. Alternatively or additionally, the biochar 320 can be separated from other reactor materials using one or more separator devices. Water can be applied to the biochar 320 (e.g., using a spraying device) to make the biochar inert or less likely to combust or react with oxygen. Additionally or alternatively, the biochar 320 can be made inert through controlled oxidation, for example, where the biochar 320 is exposed to a low level or flowrate of oxygen or air (e.g., in a sealed container) for a period of time (e.g., 1 hour, 2 hours, 4 hours, or more). The controlled oxidation can oxidize the biochar 320 without providing enough oxygen to cause a thermal runaway.

The gas stream 322 is provided to the condenser/separator 314, which condenses or separates bio-oil 324 from other, non-condensable gases in the gas stream 322, including syngas 326. The condenser/separator 314 can be or include, for example, a multi-step condenser (e.g., including a gas condenser and an acid condenser). In some examples, a multi-step condenser can be used to fractionate the bio-oil 324 according to molecular weight (e.g., with one fraction having heavier molecules and another fraction having lighter molecules) and/or according to water content (e.g., with one fraction having more water than another fraction). The bio-oil 324 can be stored in a tank and used for a variety of purposes. The bio-oil 324 can have properties similar to those of crude oil removed from geological formations after many millions of years. The bio-oil 324, however, can be heavily oxygenated compared to crude oil (e.g., typically 30-40% oxygen for the bio-oil 324 on a dry weight basis, compared to 1% oxygen for crude oil). In some examples, accumulated bio-oil 324 can be periodically offloaded from the pyrolyzer 300 and transferred to a larger storage tank or shipped to an offsite facility.

The syngas 326 can be provided to the generator 316, which can generate heat and/or electricity used by the pyrolyzer 300. For example, the generator 316 can provide heat to the reactor 312 for performing pyrolysis. Additionally or alternatively, the generator 316 can use the syngas to generate electricity used by components of the pyrolyzer 300, such as one or more computers, motors, etc. Electricity can be generated directly using a modified diesel generator or indirectly using a heated gas turbine system. In various examples, the pyrolyzer 300 can utilize pyrolysis equipment and/or systems used by and/or available from NETTEN-ERGY B.V. or NETTOIL B.V. in the Netherlands.

In certain implementations, an electrostatic precipitator 328 or other scrubbing device can be used to remove particles from one or more gas streams in the pyrolyzer 300. For example, the electrostatic precipitator 328 can be used to remove particles of biochar, minerals, and/or ash from a stream of syngas 326. The particles can be collected, stored in a bin, and/or applied to a field (e.g., the field 110) with or without the biochar 320.

Figure 4:
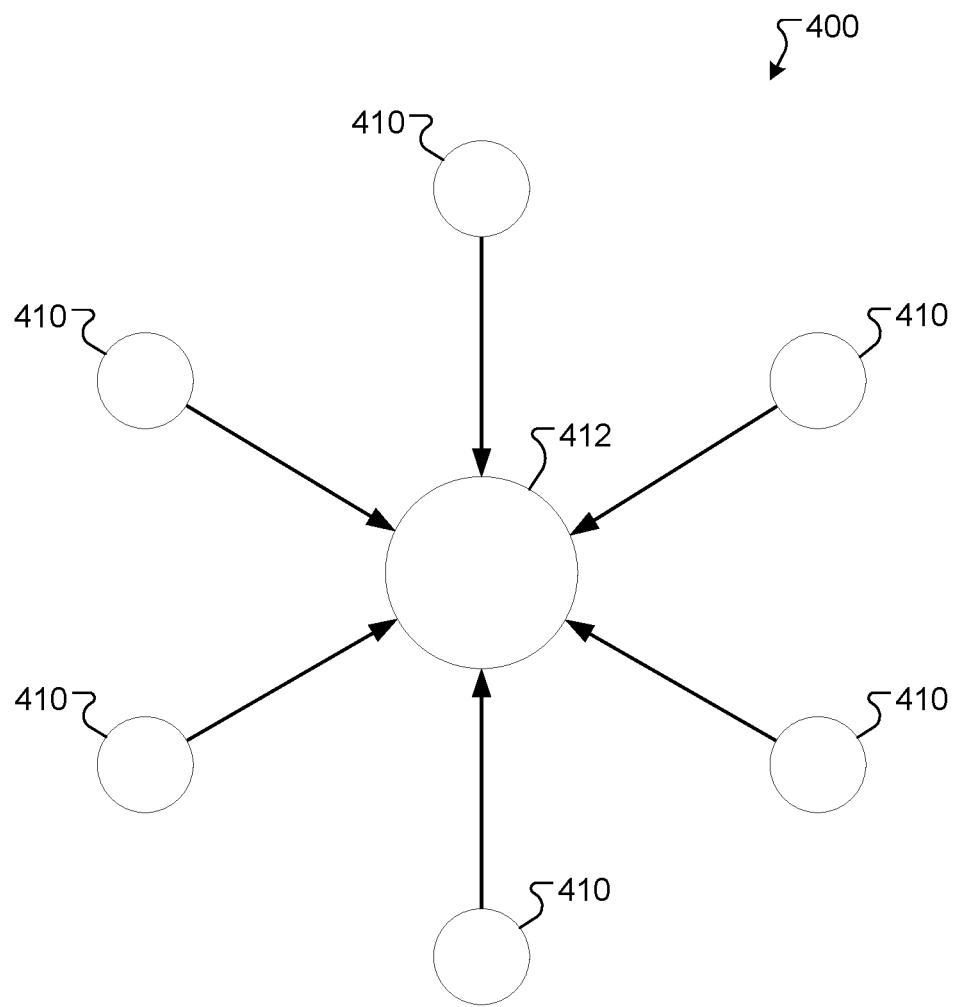
FIG. 4 is a schematic diagram of a bio-oil distribution system, in accordance with certain examples.

FIG. 4 is a schematic diagram of a bio-oil distribution system 400 based on a hub and spoke model, in accordance with certain examples. A plurality of mobile pyrolysis plants 410 (e.g., mobile pyrolyzers 114) are used to generate bio-oil in or around a plurality of respective fields (e.g., fields 110) where biomass is grown. The fields can be or include, for example, farmers' fields, natural fields, meadows, forests, etc. The bio-oil produced by the mobile pyrolysis plants can be delivered (e.g., by pipeline, truck, and/or train) from the mobile pyrolysis plants 410 to a central storage or processing facility 412. The facility 412 can use the bio-oil as fuel or for other purposes (e.g., carbon sequestration in underground wells). Additionally or alternatively, the facility 412 can deliver the bio-oil to a different facility, which can receive additional shipments of bio-oil from other locations.

Advantageously, the systems and methods described herein, including the distribution system 400, can significantly reduce the cost, energy, and labor associated with producing bio-oil and biochar from biomass. For example, the use of an on-field, mobile pyrolyzer (e.g., mobile pyrolyzer 114) allows bio-oil and biochar to be produced on the field, where the biomass is grown and harvested. This avoids the labor and expense associated with collecting biomass from the field, forming bales of biomass, and transporting the biomass to a remote location for pyrolysis. The distribution system 400 allows bio-oil to be produced where the biomass is grown and then shipped to larger facilities for further processing.

Particular embodiments of the subject matter have been described. Other embodiments are within the scope of the present disclosure. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A method comprising:
   providing a mobile pyrolyzer configured to traverse a field where biomass is grown;
   providing harvested biomass to the mobile pyrolyzer as the mobile pyrolyzer traverses the field;
   subjecting the harvested biomass to a fast pyrolysis process in the mobile pyrolyzer to generate biochar, bio-oil, and syngas as the mobile pyrolyzer traverses the field;
   oxidizing the biochar through controlled oxidation on the mobile pyrolyzer by exposing the biochar to a low level or flowrate of oxygen or air;
   applying the oxidized biochar to the field as the mobile pyrolyzer traverses the field;
   storing the bio-oil on the mobile pyrolyzer; and
   periodically offloading the bio-oil from the mobile pyrolyzer to a storage tank.

2. The method of claim 1, wherein the mobile pyrolyzer is disposed on a vehicle or a trailer.

3. The method of claim 1, wherein providing the harvested biomass comprises providing the harvested biomass to the mobile pyrolyzer from a harvesting machine.

4. The method of claim 3, wherein the mobile pyrolyzer is towed behind the harvesting machine on a trailer.

5. The method of claim 3, wherein the mobile pyrolyzer traverses the field adjacent to the harvesting machine.

6. The method of claim 1, wherein providing the harvested biomass comprises:
   collecting the harvested biomass from the field; and
   processing the harvested biomass into particles ranging in size from about 5 mm to about 50 mm.

7. The method of claim 1, wherein applying the oxidized biochar comprises applying at least one of a silicate or calcium hydroxide to the field along with the biochar.

8. The method of claim 1, further comprising applying water to the oxidized biochar to make the oxidized biochar less reactive.

9. The method of claim 1, wherein the fast pyrolysis process takes place in an autothermal reactor.

10. The method of claim 1, further comprising using the syngas to generate heat for a reactor in the mobile pyrolyzer.

11. The method of claim 1, further comprising using the syngas to generate electricity for at least one component of the mobile pyrolyzer.

12. The method of claim 1, wherein the fast pyrolysis process is configured to produce from about 0.4 kg to about 0.75 kg of bio-oil for each 1 kg of the harvested biomass.

13. The method of claim 1, wherein the fast pyrolysis process is configured to produce at least about 0.4 kg of bio-oil and at most about 0.25 kg of biochar for each 1 kg of the harvested biomass.

14. The method of claim 1, wherein the storage tank is on the field.

15. The method of claim 1, wherein subjecting the harvested biomass to the fast pyrolysis process comprises using a catalyst.

16. A system comprising:
   a mobile pyrolyzer configured to:
      traverse a field where biomass is grown;
      obtain harvested biomass from the field as the mobile pyrolyzer traverses the field;
      subject the harvested biomass to a fast pyrolysis process to generate biochar, bio-oil, and syngas as the mobile pyrolyzer traverses the field;
      oxidize the biochar through controlled oxidation on the mobile pyrolyzer by exposing the biochar to a low level or flowrate of oxygen or air;
      store the bio-oil on the mobile pyrolyzer; and
      periodically offload the bio-oil from the mobile pyrolyzer to a storage tank; and
   a spreader for applying the oxidized biochar to the field as the mobile pyrolyzer traverses the field.

17. The system of claim 16, wherein the mobile pyrolyzer is disposed on a vehicle or a trailer.

18. The system of claim 16, wherein the mobile pyrolyzer obtains the harvested biomass from a harvesting machine.

19. The system of claim 18, wherein the mobile pyrolyzer is towed behind the harvesting machine on a trailer, or wherein the mobile pyrolyzer traverses the field adjacent to the harvesting machine.

20. The system of claim 16, wherein the mobile pyrolyzer obtains the harvested biomass by collecting the harvested biomass from the field.

21. The system of claim 16, wherein the mobile pyrolyzer comprises an autothermal reactor configured to perform the fast pyrolysis process.

22. The system of claim 16, wherein the mobile pyrolyzer is further configured to use the syngas to generate heat for a reactor in the mobile pyrolyzer.

23. The system of claim 16, wherein the mobile pyrolyzer is further configured to use the syngas to generate electricity for at least one component of the mobile pyrolyzer.

24. The system of claim 16, wherein the spreader is further configured to apply a silicate to the field along with the biochar.

* * * * *